(12) United States Patent
Barker

(10) Patent No.: US 7,853,349 B2
(45) Date of Patent: Dec. 14, 2010

(54) SYSTEMS AND METHODS FOR GANGSAW MANAGEMENT

(75) Inventor: Earl Barker, Enumclaw, WA (US)

(73) Assignee: EB Associates, Inc., Enumclaw, WA (US)

( * ) Notice: Subject to any disclaimer, the term of this patent is extended or adjusted under 35 U.S.C. 154(b) by 466 days.

(21) Appl. No.: 11/873,101

(22) Filed: Oct. 16, 2007

(65) Prior Publication Data

US 2009/0095379 A1   Apr. 16, 2009

(51) Int. Cl.
G06F 19/00 (2006.01)
B26D 7/06 (2006.01)
B23Q 16/00 (2006.01)

(52) U.S. Cl. .............. 700/167; 83/425.2; 144/374; 144/392

(58) Field of Classification Search ............ 700/167, 700/175, 179; 83/425.2, 425.3, 425.4, 358, 83/359, 61, 73; 144/387, 389, 392, 416, 144/417, 374, 237, 356, 357; 382/141, 152
See application file for complete search history.

(56) References Cited

U.S. PATENT DOCUMENTS

| | | | |
|---|---|---|---|
| 3,931,589 A | 1/1976 | Aisenberg et al. | |
| 4,437,367 A | 3/1984 | Hauser | |
| 4,524,812 A | 6/1985 | Murphy | |
| 4,691,601 A | 9/1987 | Peddinghaus | |
| 4,926,917 A | 5/1990 | Kirbach | |
| 5,897,800 A | 4/1999 | Sawai et al. | |
| 6,041,683 A | 3/2000 | Timperi et al. | |
| 6,064,035 A | 5/2000 | Toller et al. | |
| 6,094,269 A | 7/2000 | Ben-Dove et al. | |
| 6,127,649 A | 10/2000 | Toller et al. | |
| 6,382,062 B1 | 5/2002 | Smith | |
| 6,425,346 B1 | 7/2002 | Birk | |
| 6,437,357 B1 | 8/2002 | Weiss et al. | |
| 6,449,585 B1 | 9/2002 | Hyun et al. | |
| 6,466,305 B1 | 10/2002 | McBain | |
| 6,681,672 B2 | 1/2004 | Myrfield | |
| 6,988,439 B2 | 1/2006 | Liu et al. | |
| 2001/0034561 A1 | 10/2001 | Myrfield | |
| 2004/0250917 A1* | 12/2004 | Kennedy et al. | 144/408 |
| 2006/0053990 A1 | 3/2006 | Barker | |
| 2007/0263918 A1* | 11/2007 | Jenya | 382/141 |
| 2008/0029511 A1 | 2/2008 | Barker et al. | |
| 2009/0095377 A1 | 4/2009 | Barker | |
| 2009/0095378 A1 | 4/2009 | Barker | |
| 2009/0255607 A1 | 10/2009 | Barker | |

OTHER PUBLICATIONS

"Size Does Matter". Perceptron—USNR News May 2003: 1-3.*
"SeeCon: MillWide Lumber Size Control". USNR Brochure (2004), and available on Internet Mar. 11, 2006: http://web.archive.org/web/20060311042812/http://www.usnr.com/media/Seecon.pdf.*
"Automatic On-Line Control Solution for Multiple Parallel Sawn Pieces in Log Breakdown and Resaw," Inx Systems SeeCon SC2000 Real-Time Lumber Size Control System, Inx-Systems, Inc., Cumming, Georgia, 2 pages.

(Continued)

Primary Examiner—Ryan A Jarrett
(74) Attorney, Agent, or Firm—Sed IP Law Group PLLC

(57) ABSTRACT

The geometric characteristics for a plurality of boards that have been completely sawn by a gangsaw are determined. A sawn surface of one of the plurality of boards is then logically associated with one of the plurality of saw blades in the gangsaw.

28 Claims, 13 Drawing Sheets

OTHER PUBLICATIONS

"Inx SeeCon SC2000 & SC2000L: True Real-Time Lumber Size Control System—Technical Considerations for Successful Installation," Inx Systems Technical Information, Inx-Systems, Inc., Cumming, Georgia, 2002, 8 pages.

"INX SeeCon SC2000 On-Line Lumber Size Control System: Payback Time & Return-on-Investment," Inx-Systems, Inc., Cumming, Georgia, Dec. 12, 2001, 8 pages.

"Modern Mill-Wide Lumber Size Control: Methods and Components of a Complete Lumber Size Control System," Inx Systems Educational Information, Inx-Systems, Inc., Cumming, Georgia, 2002, 7 pages.

"Sawmill Operator's Guide to Greater Profits: Everything Profit-Conscious Management Needs to Know about New True Real-Time Lumber Size Control," Inx Systems Managerial Information, Inx-Systems, Inc., Cumming, Georgia, 2002, 13 pages.

"SeeCon True Real-Time Lumber Size Control System—Frequently Asked Questions," 2002, 7 pages.

Vuorilehto, "Benefits of Continuous Dimension Control in Sawmills," Inx-Systems, Inc., Cumming, Georgia, 9 pages.

Vuorilehto, "Manual Lumber Measurement Too Slow for Today's Sawmills: Computerized Measures of Lumber After Blade or Setup Changes Gather Far More Accurate Data than Manual Methods; Fixing Errors is Faster," Inx-Systems, Inc., Cumming, Georgia, 8 pages.

Vuorilehto, "New Inx Saw Blade Manager Software Optimizes Production Volume and Quality; Minimizes Downtime and Blade Costs," Inx-Systems, Inc., Cumming, Georgia, 4 pages.

Vuorilehto, "Size Control of Lumber by Optical Means," Inx-Systems, Inc., Cumming, Georgia, 6 pages.

Barker, "Sawmill Log Speed Adjustment System Using Saw Deflection Information," Office Action mailed Mar. 15, 2007 for U.S. Appl. No. 10/942,575, 5 pages.

Barker, "Sawmill Log Speed Adjustment System Using Saw Deflection Information," Amendment filed Sep. 4, 2007 for U.S. Appl. No. 10/942,575, 6 pages.

Barker, "Sawmill Log Speed Adjustment System Using Saw Deflection Information," Office Action mailed Nov. 2, 2007 for U.S. Appl. No. 10/942,575, 13 pages.

Barker, "Sawmill Log Speed Adjustment System Using Saw Deflection Information," Amendment filed May 2, 2008 for U.S. Appl. No. 10/942,575, 6 pages.

Barker, "Sawmill Log Speed Adjustment System Using Saw Deflection Information," Office Action mailed Jun. 23, 2008 for U.S. Appl. No. 10/942,575, 12 pages.

* cited by examiner

SYSTEMS AND METHODS FOR GANGSAW MANAGEMENT

BACKGROUND

1. Technical Field

This description generally relates to gangsaws, and more particularly to managing the use of saw blades within gangsaws.

2. Description of the Related Art

In many sawmills, gangsaws are used to saw cants into individual boards for further processing. Such gangsaws typically include many parallel, circular saw blades located at precise intervals within a sawbox and, at the front of the sawbox, two chip heads (e.g., vertical drum chip heads) for removing excess wood from the outside of the cant. Cants may be transported in a straight line through the gangsaw using feed rolls on the upstream and downstream sides of the sawbox or may be driven through the gangsaw along a curved path during a curve sawing process. Alternatively, the cants may be transported in a straight line while the saw blades and chip heads move to create a curved sawing path. Since gangsaws can have more saw blades than are necessary to saw each cant, many gangsaws also allow automatic or manual selection of which saw blades will be used to saw any particular cant.

The gangsaw saw blades are typically organized into single arbor or double arbor configurations. In a single arbor gangsaw, a series of circular saw blades spaced apart by saw guides are mounted on a splined arbor. The saw guides typically ride on a separate shaft and are plumbed to deliver lubrication to the saw blades. Often, the saw guides are situated so that the saw teeth have just left the saw guides before entering the cant. Thus, the thickness accuracy of the boards near the saw guides is relatively good, even when the gangsaw itself is cutting poorly. A double arbor gangsaw is configured similarly, but with two splined arbors instead of one.

In many gangsaws, the number of saw blades on each arbor exceeds the capacity of the lubrication system. The saw blades may therefore be split into banks, each with a separate lubrication supply. A typical gangsaw might, for example, have 22 saw blades separated into two banks of 11 saw blades each.

As a saw blade in a gangsaw is used, it is subjected to a variety of forces that tend to push or pull the saw blade out of alignment with the other saw blades. For example, during curve sawing, the saw blade may be pushed or pulled in one direction or another by the sawn cant. As another example, if the chip heads upstream of the gangsaw are not removing enough wood, a cant may rub against the saw blades at the edges of the cant, pushing them out of alignment. In fact, even if the sawing process is otherwise going smoothly, the saw blade may encounter a particularly hard section of wood and be forced sideways around that section. This tends to happen with greater frequency as the saw blade ages and becomes duller.

When a saw blade is out of alignment or "lays over," boards sawn by the defective saw blade no longer have their nominal thickness but show uneven geometries indicative of the sawing characteristic of the saw blade. In a single arbor gangsaw, boards sawn by a defective saw blade may show evidence of "wedging." The thickness of a board showing wedging typically varies across its width, from a nominal thickness at those portions sawn closest to the saw guides to a maximum variation at those portions sawn farthest from the saw guides.

In a double arbor gangsaw, boards sawn by a defective saw blade may show evidence of "mismatch." Mismatch occurs when a saw blade is out of alignment with a corresponding saw blade on the other arbor. The thickness of a board showing mismatch is typically close to the nominal thickness at those portions sawn closest to the saw guides and shows a maximum variation at those portions sawn where the saw blades of the top and bottom arbors overlap on the board.

When the wedging or mismatch becomes too significant, a gangsaw must be shut down and the defective saw blade found and replaced, leading to significant losses in productivity. In many sawmills, it can also be difficult to identify the defective saw blade, as mismatch and wedging are often detected only after subsequent processing that mixes the boards.

Even slight wedging or mismatch can also lead to losses at a sawmill. In many sawmills, each piece of final lumber is planed according to the maximum allowed wedging or mismatch (such that regardless of the defective saw blades in the gangsaw, the resulting lumber is planar). This planing process further requires that the lumber is sawn such that sufficient excess material is available. If wedging or mismatch defects could be minimized, the amount of fiber removed by planing could be similarly minimized, thereby maximizing the lumber extracted from each log.

It is desirable therefore to have improved feedback systems that can provide early insight into the geometry of boards sawn by a gangsaw.

BRIEF SUMMARY

A feedback system addressing many of the above problems is described below. The feedback system includes laser scanners downstream from the gangsaw, which scan the boards sawn from each cant. The laser scanners are positioned to scan the boards after the sawing process is completed, so that the boards are completely separated, although the boards may still be piled on top of one another. The laser scanners are also close enough to the outfeed of the gangsaw so that all of the boards from one cant are distinguishable from the boards from other cants, and the boards from each cant have not yet been mixed up with respect to one another. That is, a board to the left of another board during the laser scanning was also to the left of the other board during sawing.

A computer then receives image data from the laser scanners and analyzes the image data to determine the original orientation of the boards during sawing. The computer takes advantage of some characteristics of board geometry in order to determine this original orientation. For example, if the boards are from a double arbor gangsaw and the cant was tall enough to be sawn by both arbors, then a mismatch line will be a fixed distance from the bottom edge of a sawn board and a variable distance from the top edge. On the other hand, if the boards are from a single arbor gangsaw, then the bottom edge of a sawn board (which was closest to the saw guides) will match a nominal thickness more closely than the top edge. Based on these and other heuristics, the computer can determine the original orientation of the boards during sawing.

Combining this orientation information with information regarding which saw blades were used to saw a particular cant, the computer can associate sawn surfaces of the boards with corresponding saw blades in the gangsaw. Thus, the computer can track individual saw blade performance. This performance information can be used to adjust saw blade usage to keep mismatch and wedging within defined defect limits.

Using this feedback system, the amount of excess material left to allow for planing can be minimized, and defective saw blades can be rapidly identified and replaced as necessary.

Indeed, the feedback system may be used to "work around" defective saw blades, using the other saw blades in the gangsaw until a relatively convenient time presents itself for changing out a defective saw blade.

In one example embodiment, a gangsaw may be monitored by determining geometric characteristics of boards that have been completely sawn by the gangsaw, and logically associating a sawn surface of one of the boards with one of the gangsaw's saw blades. In another embodiment, a gangsaw monitoring system may include at least one laser scanner positioned to scan boards that have been completely sawn by the gangsaw. A computing device may then receive data from the laser scanner in order to determine geometric characteristics of the boards and logically associate a sawn surface of one of the boards with one of the gangsaw's saw blades.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sawmills, gangsaws, saw blades, computing devices, programmable logic controllers and/or laser scanners have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Description of an Example System for Monitoring Boards Sawn by a Gangsaw

Figure 1:
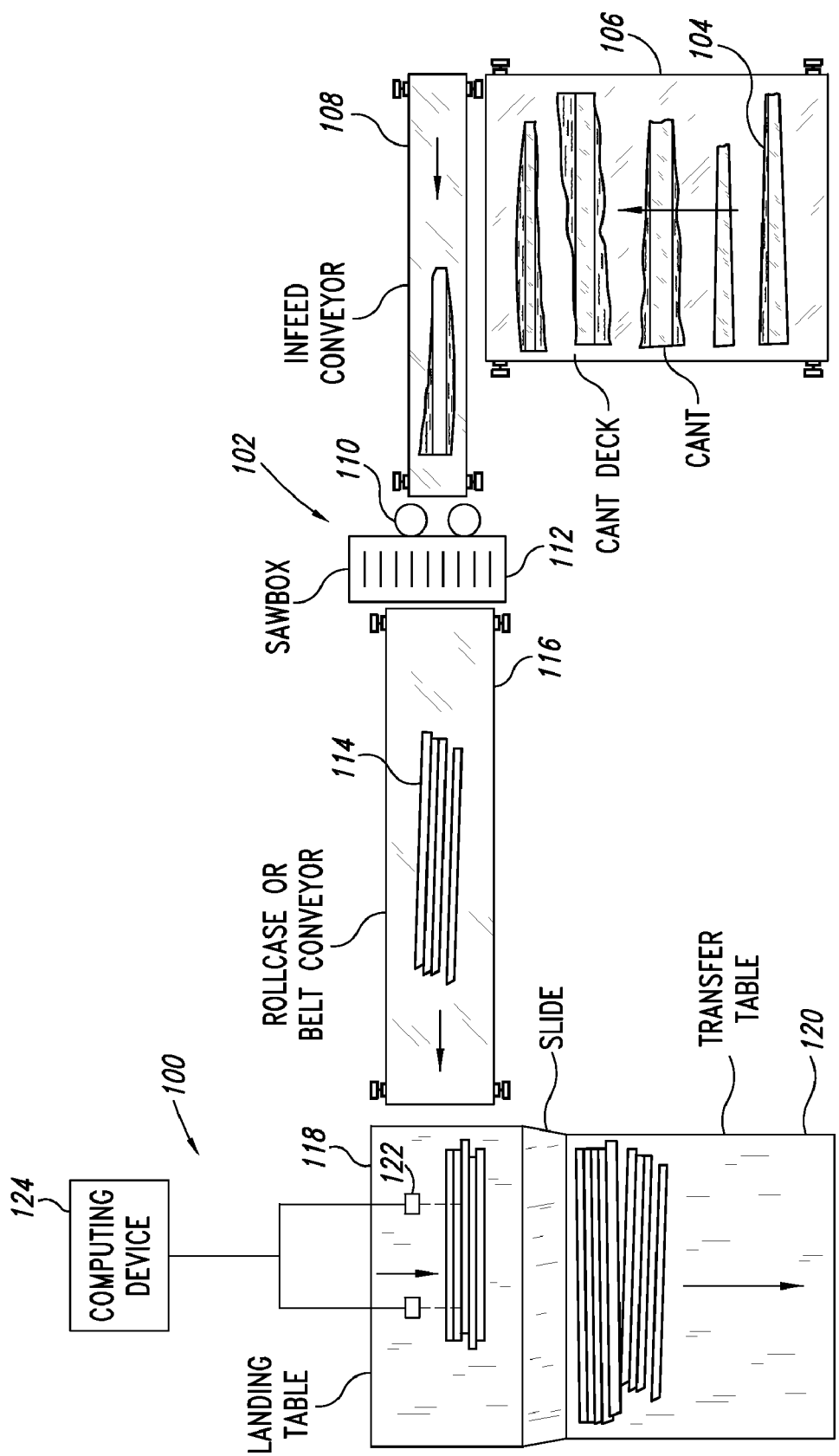
FIG. 1 is an overhead schematic view of an example environment for a system for monitoring boards that have been sawn by a gangsaw, according to one illustrated embodiment.

FIG. 1 shows an example environment for a system 100 for monitoring boards 114 that have been sawn by a gangsaw 102. In one embodiment, the gangsaw 102 is one processing machine within a sawmill. However, the system 100 may also be incorporated into other environments utilizing gangsaws.

As illustrated, cants 104 initially arrive at a cant infeed deck 106. The cants 104 may have been processed by a variety of machines before arriving at the cant infeed deck 106. For example, log segments may initially have been processed at one or more primary breakdown machines, where the sides of the log segments are sawn off using bandsaws to create cants 104 and sideboards. The cants 104 may then be transported via the cant infeed deck 106 and a gang infeed conveyor 108 to the gangsaw 102. In other environments, the log segments themselves may instead be processed by the gangsaw 102. In still other environments, other pieces of wood may be processed by the gangsaw 102, including logs, boards, flitches, pieces of lumber, etc.

The gangsaw 102 may have any of a number of configurations. For example, the gangsaw 102 may be either a single arbor or a double arbor gangsaw having a number of saw blades. In one embodiment, the gangsaw 102 includes more saw blades than are used to saw each arriving cant 104, and the gangsaw 102 may be controlled to distribute the sawing workload among the saw blades to ensure that certain saw blades are not over-utilized while others are under-utilized. The gangsaw 102 may further include chip heads 110, such as vertical drum chip heads, that remove excess wood from the outside of each cant 104.

In certain embodiments, the cants 104 are scanned by either a transverse scanner located near the cant infeed deck 106, or a lineal scanner located near the gang infeed conveyor 108. If a lineal scanner is used, the gang infeed conveyor 108 may be lengthened to allow sufficient room to scan the entire cant 104 before it reaches the gangsaw 102. This scanning may be used to derive information regarding the geometry of the cants 104, and a computer optimizer may use this information to determine an optimal way to saw each cant into a plurality of boards 114.

Based on the determined optimal sawing process, the computer optimizer may further determine optimal locations for the chip heads 110 and the saw blades of the gangsaw 102. The computer optimizer may then send corresponding commands to a PLC that then directly controls the gangsaw 102 during sawing.

The relative locations of the saw blades, chip heads 110 and cants 104 may be controlled in a variety of ways. In one embodiment, the cant 104 may have an adjustable position on the gang infeed conveyor 108 before arriving at the gangsaw 102. In some embodiments, the chip heads 110 may be moved relative to the saw blades within the gangsaw 102, such that different cants 104 may be sawn by different saw blades. In other embodiments, the chip heads 110 may move relative to one another as well (to chip more or less of the wood from each cant 104 prior to sawing). In still other embodiments, the chip heads 110 may move relative to one another, while a sawbox 112 housing the saw blades of the gangsaw 102 may move relative to the chip heads 110 and the gang infeed conveyor 108.

After a cant 104 has been completely sawn by the gangsaw 102, the boards 114 may emerge from the gangsaw 102, fall apart (as illustrated), and be transported for some distance lineally along a rollcase or belt conveyor 116. The rollcase 116 may include keystock welded to the rolls that bounce the boards 114 up and down in order to remove sawdust. This bouncing may also tend to flatten the boards 114 out as it separates them. As illustrated, when the boards 114 emerge from the gangsaw 102, they are often arranged near each other and in the same order in which they were sawn by the gangsaw 102 (i.e., the third board from the left on the rollcase 116 was also the third board from the left during the sawing process).

At a landing table 118, the boards 114 may transition from lineal to transverse motion. In one embodiment, upon reaching the landing table 118, the boards 114 are still arranged in the same order in which they were sawn by the gangsaw 102, and the boards 114 from one cant 104 may remain separated from boards sawn from other cants. This may be accomplished by ensuring that the landing table conveyor moves a group of boards from one cant out of the way before a group of boards from a subsequent cant arrives.

A transfer table 120 may then transport the boards 114 transversely to another processing station within the sawmill. For example, in one embodiment, the boards 114 may be transferred to an edger or to a trimmer.

In one embodiment, the system 100 for monitoring the boards 114 may include a plurality of point laser scanners 122 located above the boards 114 on the landing table 118. The system 100 may further include a plurality of point laser scanners (not visible) located below the boards 114 on the landing table 118. The laser scanners 122 above and below the boards 114 may or may not be aligned with each other in different embodiments. Each laser scanner 122 may include at least one source of laser light directed at the boards 114, and an image generator. In one embodiment, the image generator may comprise a high resolution video camera, such as a charged coupled device (CCD) camera, or another optical system.

The image generator and the source of laser light may use triangulation to determine the three dimensional shape of the surfaces illuminated by the laser light. In other embodiments, other methods for determining the geometry of the imaged surfaces may be used, for example, by measuring the time-of-flight of the laser light.

Different arrangements of laser scanners may also be used. For example, although two laser scanners 122 above the boards 114 are illustrated, more or fewer scanners may be used in other embodiments. The laser scanners below the boards 114 may also be excluded in other embodiments or may alternatively comprise the only laser scanners 122 used in the system 100. Moreover, although the laser scanners 122 are illustrated at the landing table 118, they may also be positioned near the transfer table 120, the rollcase or belt conveyor 116, or elsewhere. At any of these locations, the laser scanners 122 may be positioned to scan boards 114 that have been completely sawn by the gangsaw 102. Other laser scanner configurations are described in further detail below with reference to FIGS. 7-9.

In still other embodiments, different imaging systems may be used in order to generate information regarding the geometry of the boards 114. For example, in one embodiment, the light source may comprise another collimated, non-laser light source or any other source of electromagnetic radiation (including diffuse sources of visible, infrared or ultraviolet radiation). The image generator may also be modified in alternative embodiments to generate images based on reflected, non-collimated light.

The image data from the laser scanners 122 (or from other image generators in alternative embodiments) may be sent to a computing device 124 for further analysis. The computing device 124 may determine geometric characteristics of the boards 114 based on this image data. The geometric characteristics of the boards 114 may comprise any location, shape, size or grain pattern information based on the image data. In certain embodiments, one or more of the boards 114 may be overlapping one another, and the computing device 124 may process the image data to interpolate geometric characteristics of even unscanned surfaces of the boards 114, as will be described in further detail below.

The computing device 124 may be further configured to logically associate at least one sawn surface of one of the plurality of boards 114 with one of the plurality of saw blades of the gangsaw 102. Thus, for example, if one of the saw blades of the gangsaw 102 is causing mismatch or wedging in the sawn boards 114, these sawing characteristics may be detected and associated with the defective saw blade. These computer-implemented processes are described in greater detail with reference to FIG. 16.

Figure 2A:
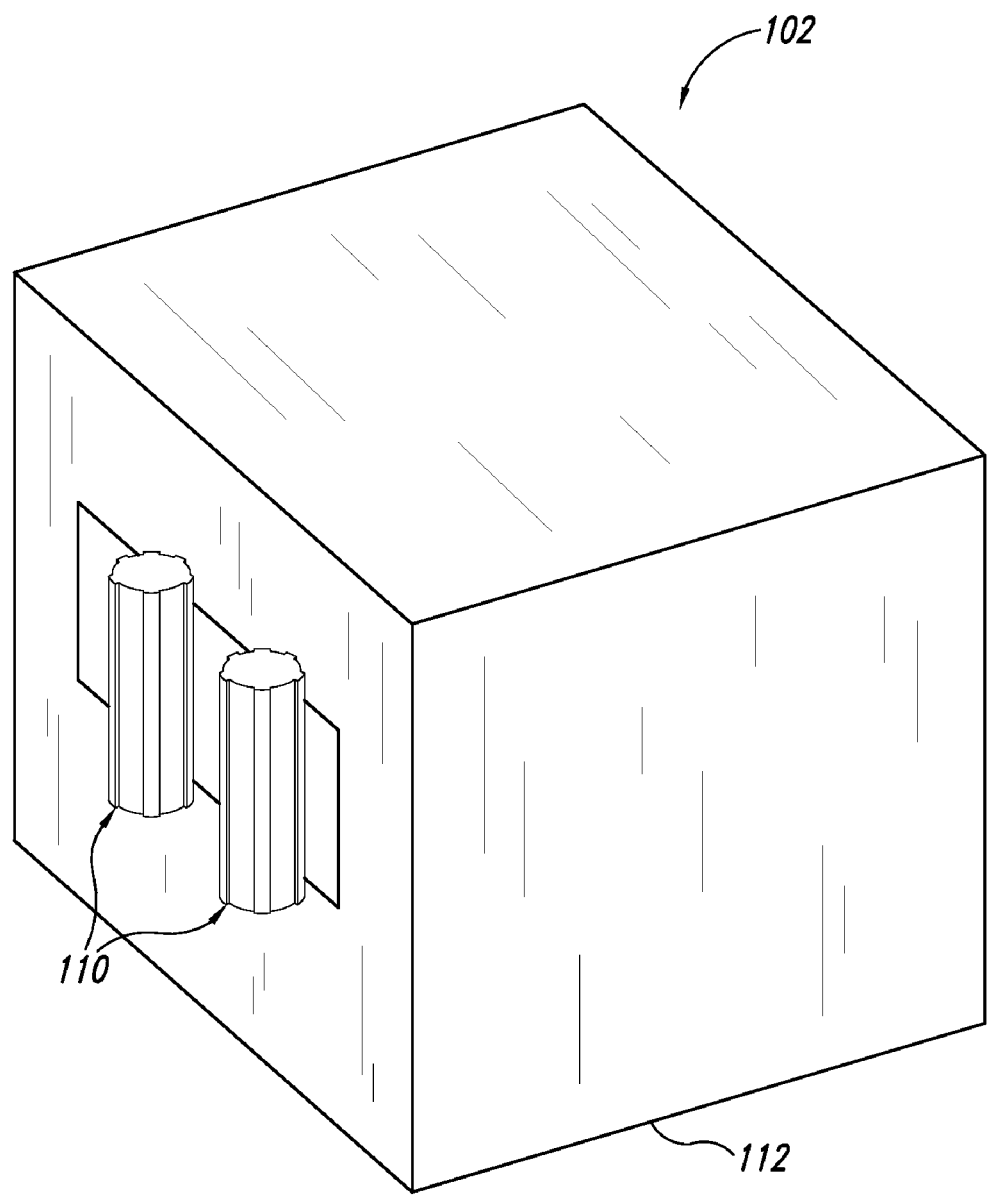
FIG. 2A is a perspective view of an exemplary double arbor gangsaw for use with the system illustrated in FIG. 1.
Figure 2B:
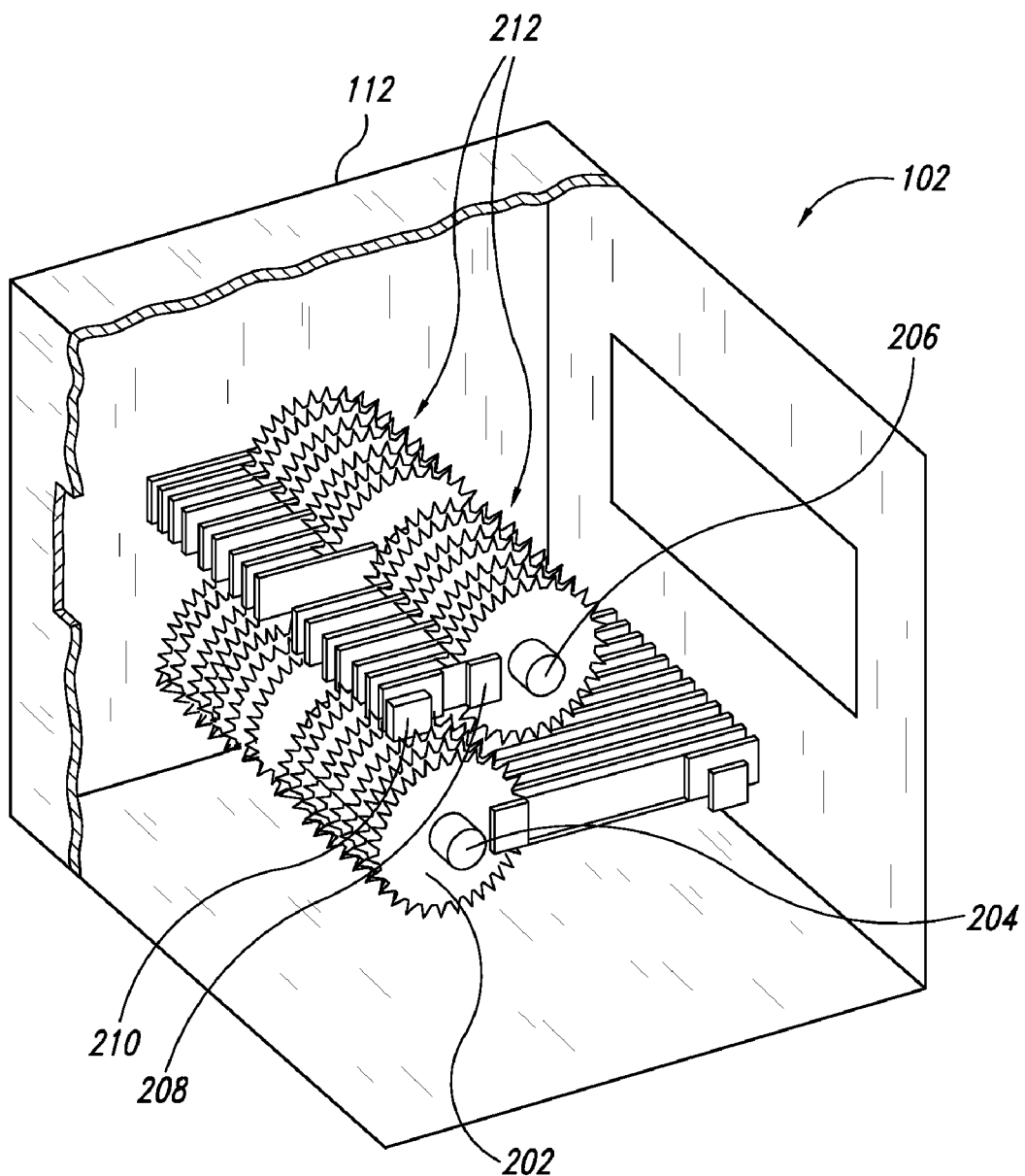
FIG. 2B is a cut-away view of the double arbor gangsaw of FIG. 2A.

FIGS. 2A and 2B illustrate external and cut-away views of an example double arbor gangsaw 102 for use with the system 100. As illustrated, the saw blades 202 are divided among a bottom arbor 204, and a top arbor 206. On each arbor, the saw blades 202 may be spaced apart by saw guides 208, which typically ride on separate shafts 210 and which may be plumbed to deliver lubrication to the portions of the saw guides 208 that are in contact with the saw blades 202. The saw guides 208 adjacent the bottom arbor 204 may be positioned such that the saw teeth have just left the saw guides 208 before sawing each cant 104. As a result, the thickness of those portions of the boards 114 sawn nearest the saw guides 208 may be closest to a nominal thickness, even when the saw blades 202 are performing poorly.

In one embodiment, the saw blades 202 are split into four banks 212, each with a separate lubrication supply. Each of the banks 212 includes seven saw blades 202, such that the gangsaw 102 as a whole includes 28 saw blades 202. In other embodiments, different configurations and arrangements for the gangsaw 102 may, of course, be used. For example, more or fewer saw blades 202 may be incorporated into the gangsaw 102; the chip heads 110 may be omitted; the lubrication system and saw guides may be differently configured; the saw blades 202 may be oriented horizontally rather than vertically, etc.

Figure 3:
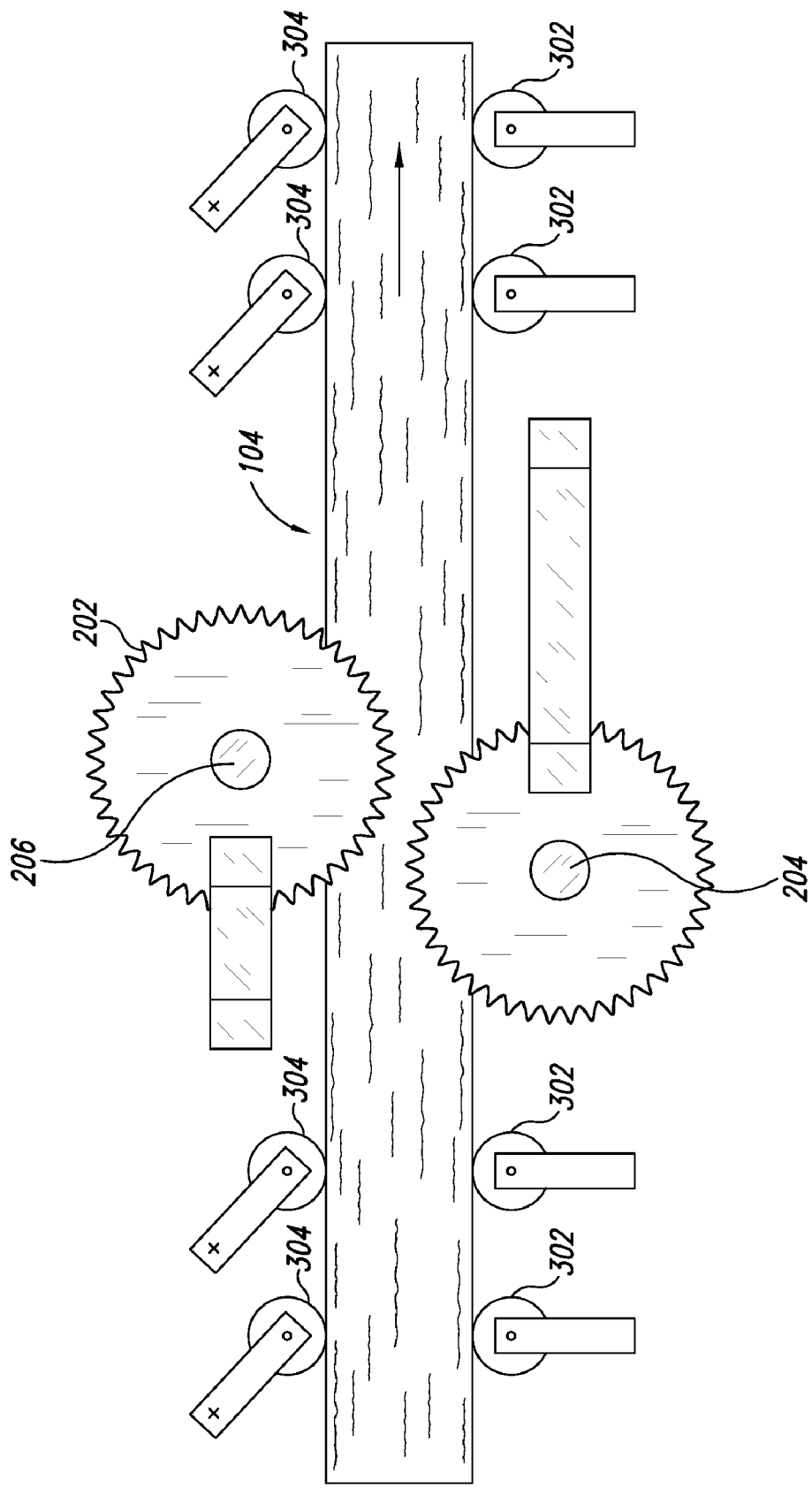
FIG. 3 is a side view of the double arbor gangsaw of FIG. 2 sawing a cant.

FIG. 3 illustrates a side view of the double arbor gangsaw 102 during a sawing process. In one embodiment, each of the saw blades 202 is capable of cutting a certain depth into a cant 104. For example, each saw blade 202 may be capable of cutting to a depth of approximately 6 inches. If, as illustrated, the cant 104 is taller than 6 inches (e.g., an 8-inch cant), then the bottom arbor 204 may cut six inches into the cant 104, while the top arbor 206 cuts the remaining portion (e.g., 2 inches) of the cant 104. In other embodiments, the cant 104 may be tall enough to be cut equally by the top and bottom arbor saws 206, 204. As may be understood, the illustrated gangsaw 102 is capable of sawing cants 104 of up to 12 inches in height.

The cant 104 may be guided by stationary rollers 302 on the bottom and by adjustable rollers 304 on the top that may move up or down depending on the height of the cant 104. These rollers 302, 304 may control the speed of the cant 104 through the gangsaw 102 and may help to resist sawing forces. In other embodiments, other methods of manipulating, controlling and guiding the cant 104 may be used.

Figure 4:
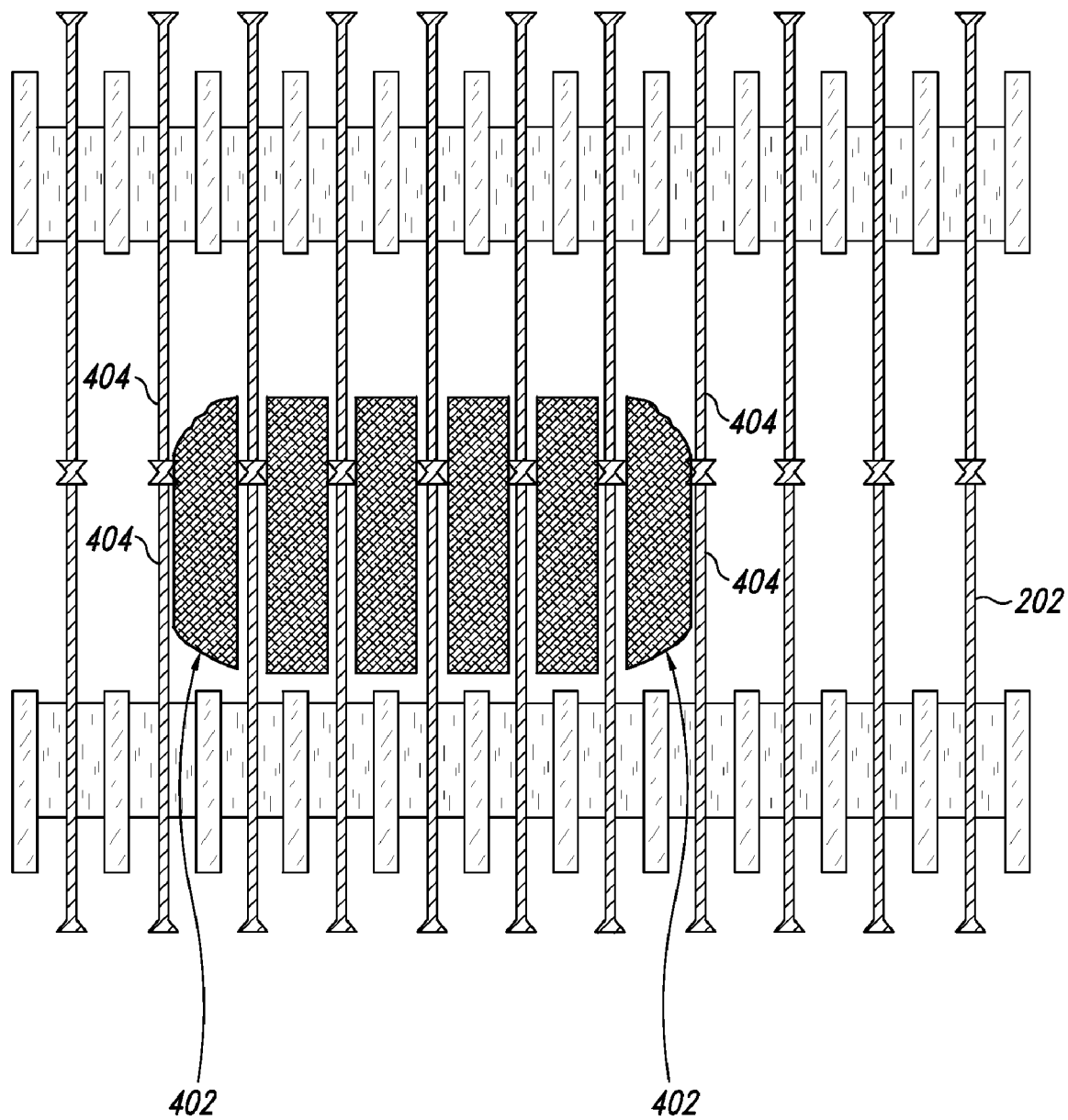
FIG. 4 is a front view of the double arbor gangsaw of FIG. 2 sawing a cant, with the saw blades of the double arbor gangsaw in alignment.

FIG. 4 is a front view of the double arbor gangsaw 102 during the sawing process illustrated in FIG. 3. In one embodiment, the sawing paths of the saw blades 202 of the top and bottom arbors 206, 204 have only minimal overlap. However, they may be configured to overlap enough to achieve a complete cut through the entire cant 104.

From the front view, it may be more easily seen that, in one embodiment, the end boards 402 have been chipped by the chip heads 110 of the gangsaw 102 to a precise thickness, such that they do not rub against the saw blades 404 flanking the cant 104. If the end boards 402 are too thick, they may rub against the flanking saw blades 404, heating them up, applying sideways forces to the saw blades 404 and shortening their useful life. On the other hand, if the end boards 402 are made too thin, they may not have the dimensions required for valuable lumber.

Figure 5:
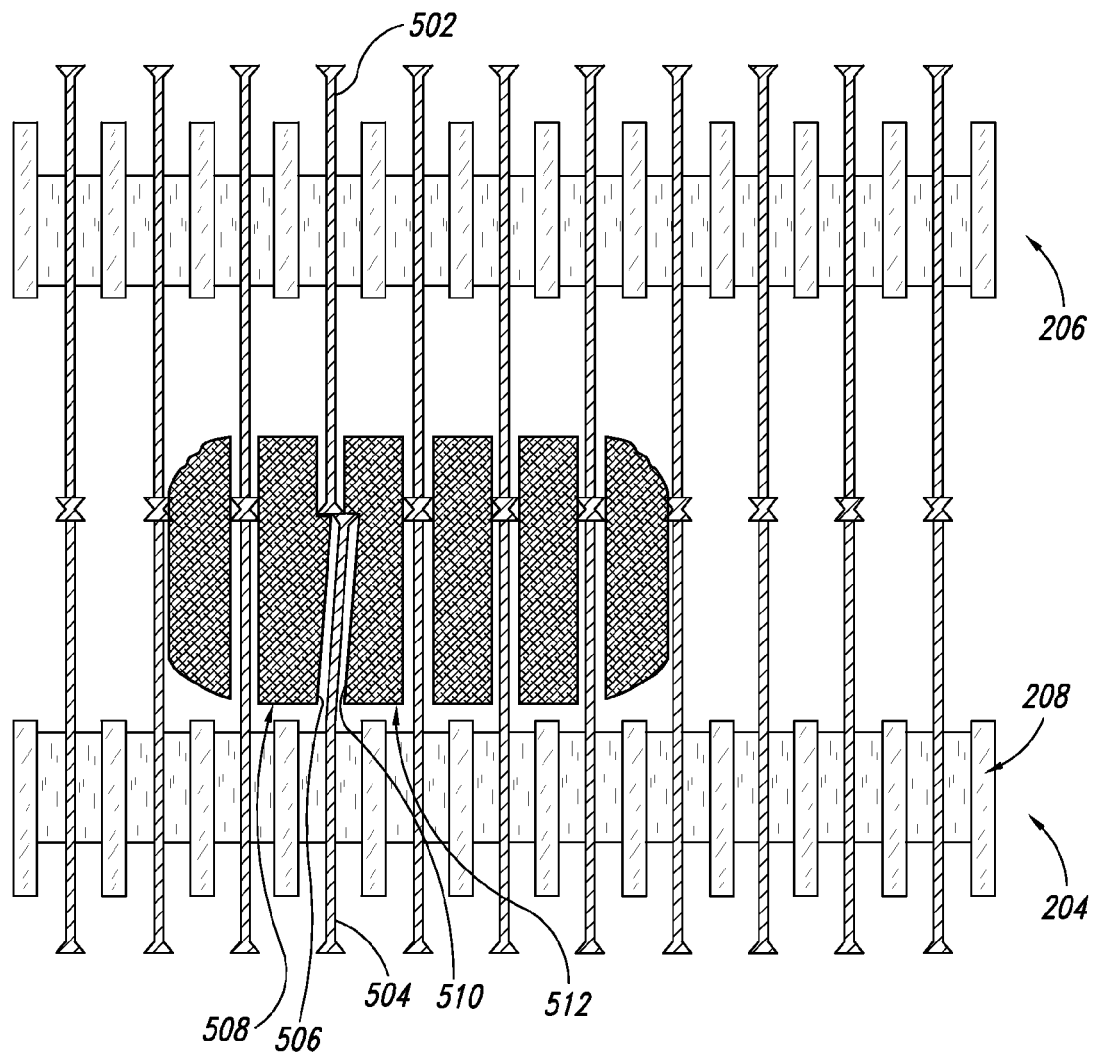
FIG. 5 is a front view of the double arbor gangsaw of FIG. 2 sawing a cant, with one of the saw blades of the double arbor gangsaw out of alignment.

FIG. 5 is a front view of the double arbor gangsaw 102, with a saw blade out of alignment. As discussed above, in a double arbor gangsaw, a defect known as mismatch may occur when saw blades of the top and bottom arbors are not perfectly aligned. As illustrated, a saw blade 504 of the bottom arbor 204 is out of alignment with a saw blade 502 of the top arbor 206. In other embodiments, other defects are, of course, possible. For example, in one embodiment, one or more of the saw blades may displace completely (as opposed to leaning over), such that a board sawn by the saw blade does not have a nominal thickness.

Figure 6:
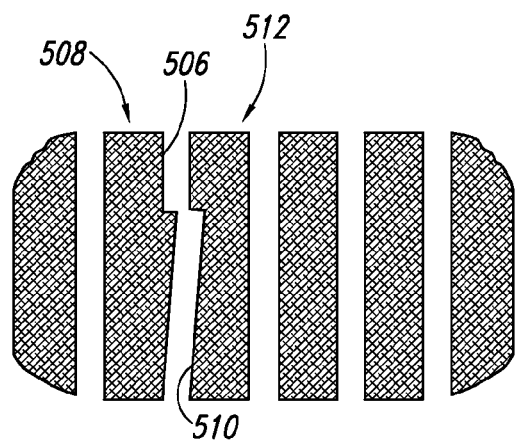
FIG. 6 is a cross-sectional view of the sawn cant illustrated in FIG. 5, showing mismatch as a result of the saw blade that is out of alignment.

The mismatch between the saw blades 502, 504 may be reflected in the geometric characteristics of the boards 114 emerging from the gangsaw 102. For example, as illustrated in FIGS. 5 and 6, a sawn surface 506 of a board 508 and a sawn surface 510 of a board 512 each show signs of the mismatch. This correspondence between adjacent sawn surfaces of adjacent boards may often be detected. That is, if one board exhibits a sloped, discontinuous sawn surface (indicating mismatch), the other board adjacent to the defective saw may also exhibit a correspondingly sloped, discontinuous sawn surface.

In one embodiment, the boards 508, 512 have a nominal thickness where they were sawn by the saw blades of the top arbor 206. Along those portions of the boards 508, 512 cut by the saw blade 504, the boards 508, 512 may vary from an approximately nominal thickness nearest the saw guides 208 to a maximum variation from that nominal thickness near the edge of the defective saw blade 504.

Figure 7:
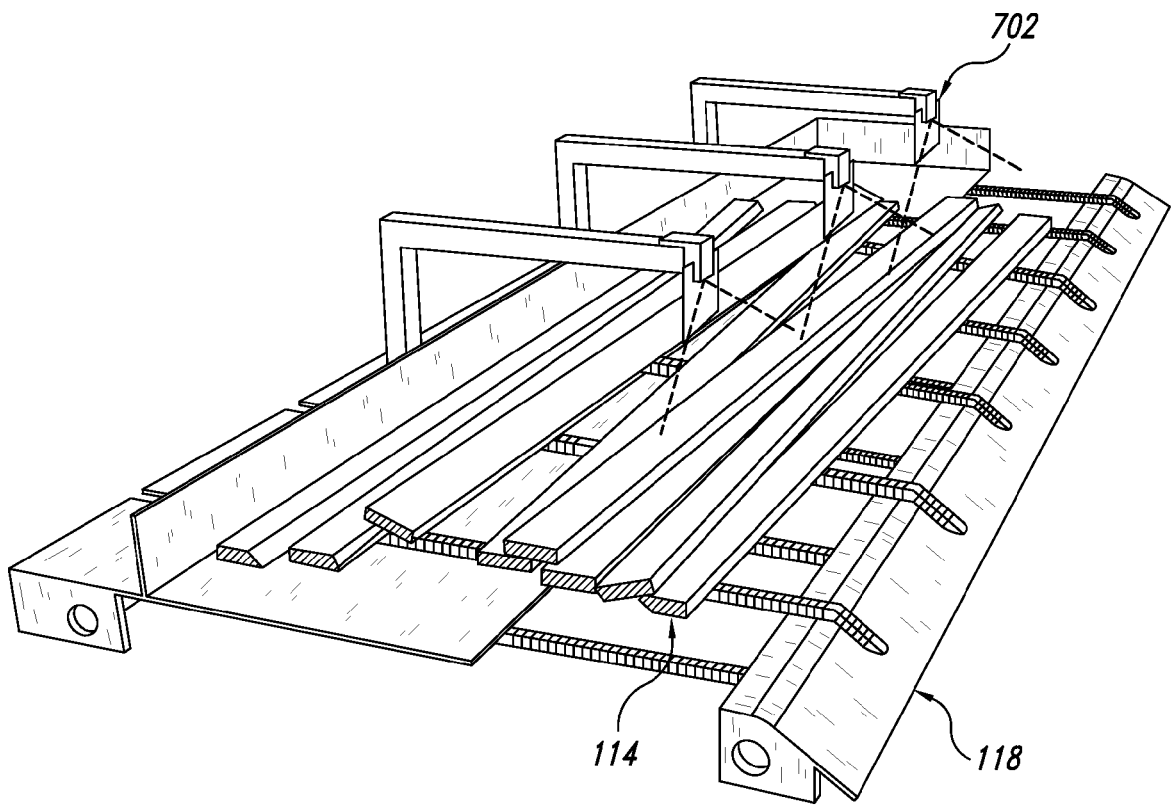
FIG. 7 is an isometric view of a plurality of planar laser scanners arranged to transversely scan boards sawn by a gangsaw, according to one illustrated embodiment.

FIG. 7 illustrates another possible arrangement of a plurality of laser scanners 702 scanning boards 114 sawn by a gangsaw 102.

The illustrated planar laser scanners 702 may be arranged, as in FIG. 1, near the landing table 118 to transversely scan the boards 114. In the embodiment of FIG. 7, the planar laser scanners 702 may scan a majority of the length of the boards 114. Thus, even if portions along the length of a particular board are overlapped or obscured by other boards, the laser scanners 702 may scan other portions of the board that remain exposed. In one embodiment, planar laser scanners 702 are also arranged below the boards 114 (not shown). Such an arrangement may allow both top and bottom surfaces of the boards 114 to be simultaneously imaged.

Each planar laser scanner 702 may comprise both a light source and an image generator. Planar laser scanners emit "lines" of laser light by rapidly moving a source of laser light back and forth. A high resolution video camera serves as the image generator, capturing the laser light reflected back towards the planar laser scanner. The video camera may comprise a charged coupled device (CCD) camera, or another optical system. Laser scanners of this type are commercially available from a number of companies, including from JoeScan of Vancouver, Wash. Alternative embodiments of the laser scanners may also be used. For example, in one embodiment, a plurality of planar laser sources are used, while a single image generator images the reflected laser light from all of the sources.

Figure 8:
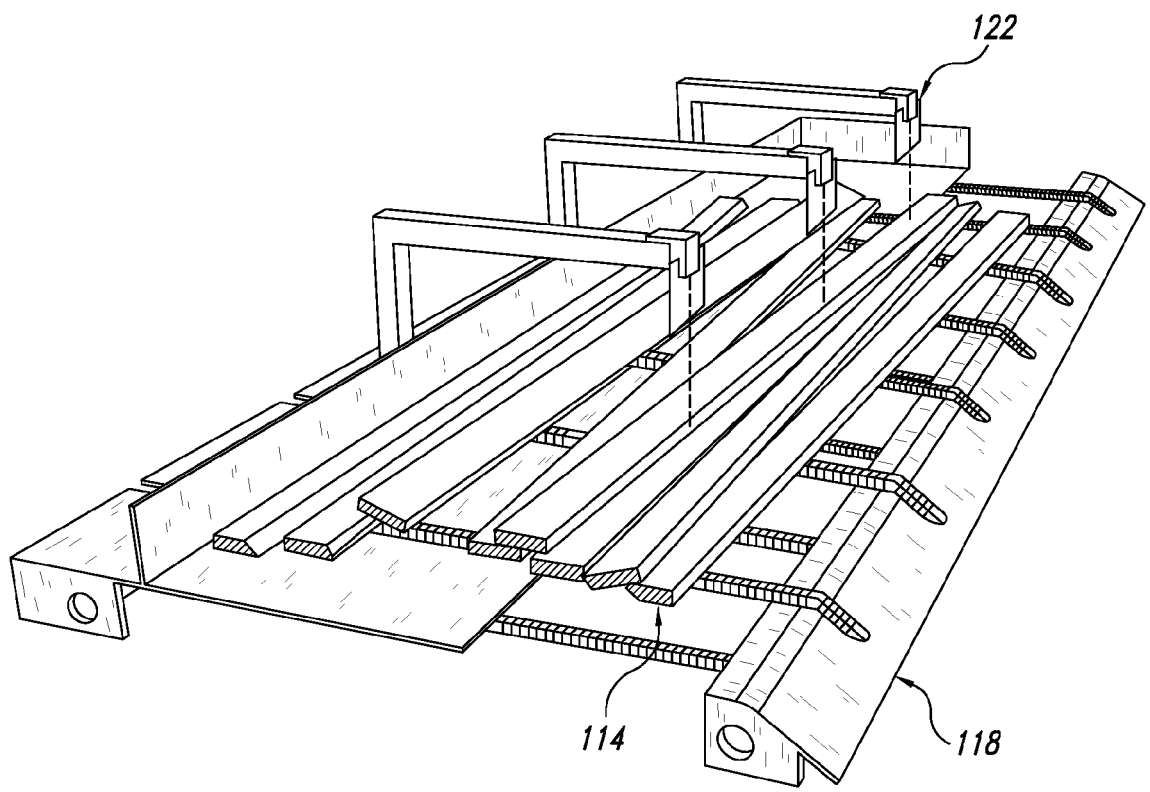
FIG. 8 is an isometric view of a plurality of point laser scanners arranged to transversely scan boards sawn by a gangsaw, according to one illustrated embodiment.

FIG. 8 is an isometric view of yet another potential arrangement for laser scanners. This embodiment is similar to that illustrated in FIG. 1, but with three rather than two point laser scanners above and below the boards 114. As illustrated, the point laser scanners 122 may be positioned at the landing table 118. By spacing the point laser scanners 122 across the length of the boards 114, even if portions along the length of a particular board are obscured, the system 100 may scan other portions of the board that remain exposed.

Figure 9:
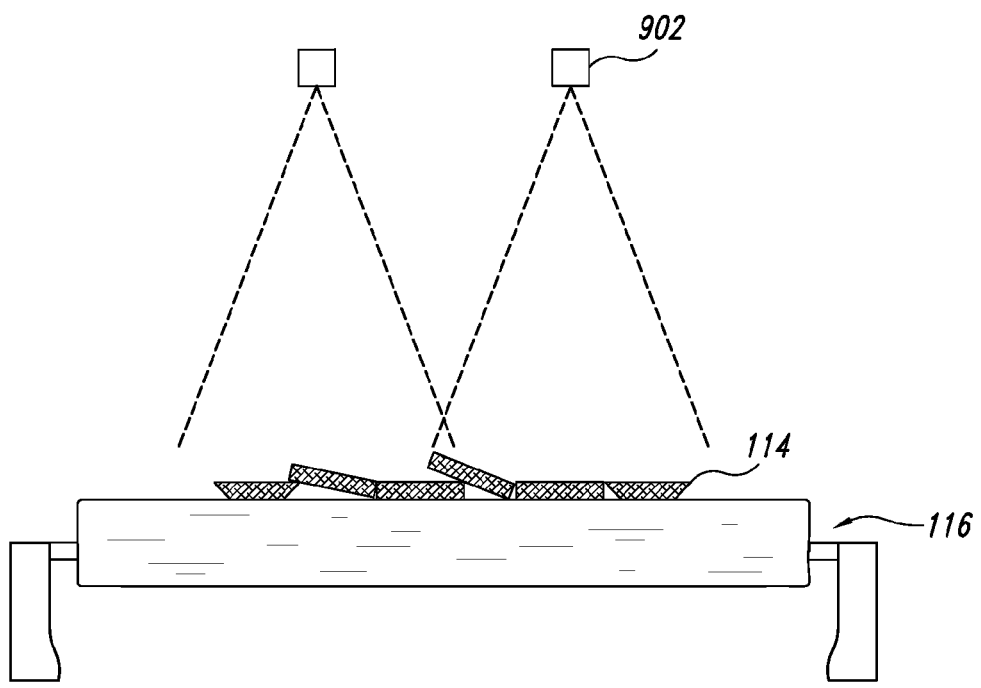
FIG. 9 is a schematic view of a plurality of planar laser scanners arranged to lineally scan boards sawn by a gangsaw, according to one illustrated embodiment.

FIG. 9 illustrates yet another potential arrangement for laser scanners in the system 100. The planar laser scanners 902 may be arranged along the rollcase or belt conveyor 116 and may be positioned to scan the boards 114 as they move lineally away from the gangsaw 102. This is in contrast to the transverse scanning arrangements illustrated in FIGS. 1, 7 and 8.

Of course, in other embodiments, other imaging configurations are possible, including those that do not incorporate laser scanners.

Figure 10:
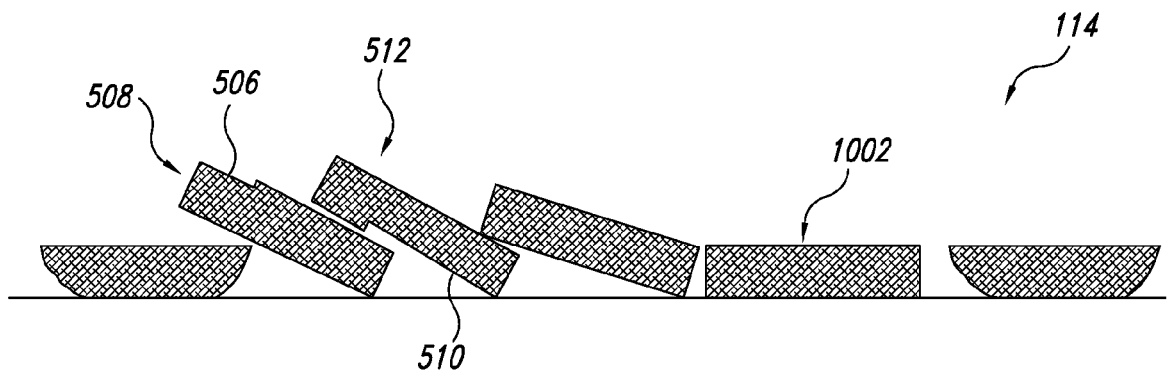
FIG. 10 is a cross-sectional view of boards sawn by a double arbor gangsaw, with two of the boards showing mismatch as a result of a saw blade that is out of alignment.

FIG. 10 is a cross-sectional view of the boards 114 sawn by the double arbor gangsaw 102 of FIG. 5. The surface 506 and the surface 510 may each have geometric characteristics indicative of mismatch. As may occur on the rollcase or belt conveyor 116 or on the landing table 118, certain of the boards 114, including the boards 508, 512, at least partially overlap one another, such that one or more laser scanners cannot directly image every surface sawn by the gangsaw 102.

Figure 11:
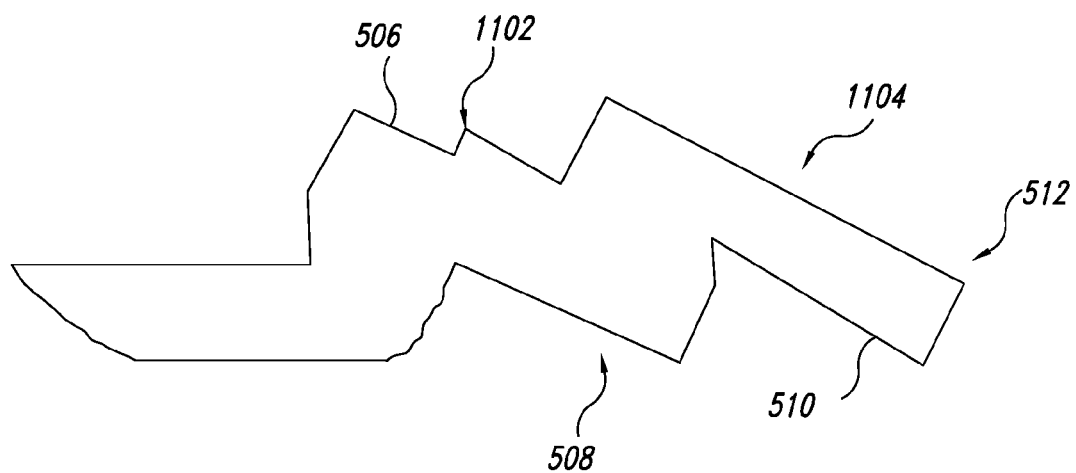
FIG. 11 is a representation of image data generated by at least one laser scanner for a subset of the boards of FIG. 10, according to one illustrated embodiment.

FIG. 11 is a graphical representation of the image data generated by a set of laser scanners scanning the top and bottom of some of the boards of FIG. 10, according to one embodiment. Any of the laser scanner configurations discussed above may be used to generate this image data, although the image data may need to be interpreted differently by the computing device 124 depending on the configuration (e.g., lineal vs. transverse scanning may yield very different sets of image data). The computing device 124 may be configured to process this image data in order to determine geometric characteristics of the boards, in addition to geometric characteristics of portions of the boards that have not been completely scanned.

As illustrated, the image data includes geometry indicative of imperfections in the sawn surfaces of the boards 508, 512. Such imperfections include a ridge 1102 in the surface 506 and a thin portion 1104 of the board 512. The analysis of this image data by the computing device 124 will be discussed in greater detail with respect to FIG. 16.

Figure 12:
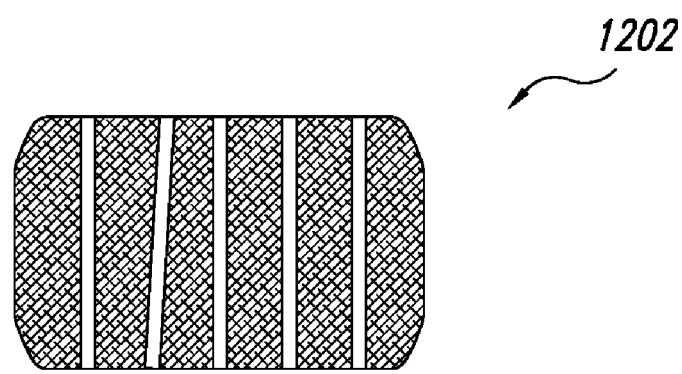
FIG. 12 is a front view of a cant sawn by a single arbor gangsaw, the cant showing wedging as a result of a saw blade that is out of alignment.
Figure 13:
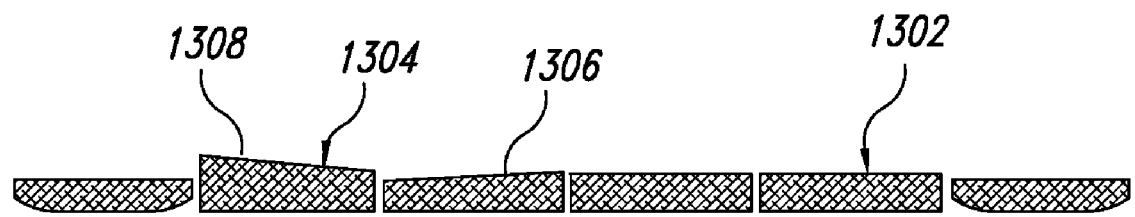
FIG. 13 is a cross-sectional view of the boards sawn from the cant of FIG. 12.

FIG. 12 is a front view of a cant 1202 sawn by a single arbor gangsaw (not shown). The boards sawn from the cant 1202 show characteristics of wedging resulting from misalignment of one of the saw blades. FIG. 13 is a cross-sectional view of the boards 1302 from the cant 1202 completely sawn by the single arbor gangsaw. As illustrated, the boards 1304, 1306 each have geometric characteristics indicative of wedging. Image data representative of these boards 1304, 1306 may be analyzed by the computing device 124 as discussed in greater detail with respect to FIG. 16.

Although not illustrated, boards sawn by a single arbor gangsaw may also vary from a nominal thickness due to the complete displacement of one or more of the saw blades. For example, if one of the saw blades completely displaces relative to the other saw blades, one of the boards sawn by that saw blade will have a greater than nominal thickness and another of the boards will have a less than nominal thickness. Such geometric characteristics may be detected and analyzed by the computing device 124 as described above.

Figure 14:
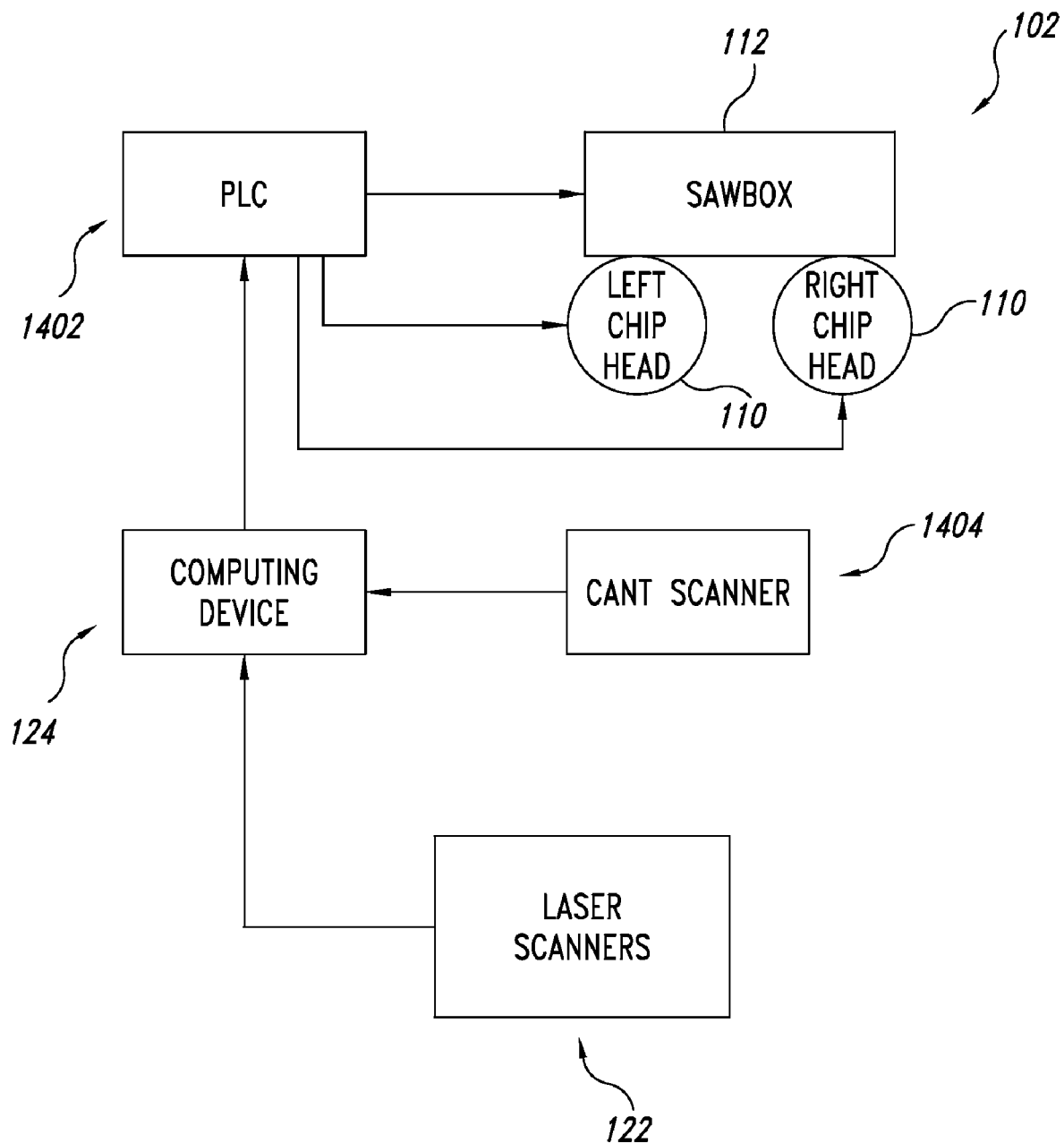
FIG. 14 is a schematic diagram of a gangsaw, a programmable logic controller (PLC), a cant scanner, a computing device, and a laser scanner, according to one illustrated embodiment.

FIG. 14 is a schematic, block diagram of a gangsaw 102, a PLC 1402, a cant scanner 1404, a computing device 124, a laser scanner 122, and the communicative couplings between them.

In one embodiment, the gangsaw 102 includes more saw blades 202 than would be used for most cants. For this reason, the sawbox 112 of the gangsaw 102 may be moved back and forth as cants arrive in order to distribute the sawing workload among the saw blades 202. For example, the gangsaw 102 may saw cants in "left-justified," "right-justified" or "centered" configurations, among others. As discussed above, the chip heads 110 may also be independently positioned. These chip heads 110 ensure that the cants entering the sawbox 112 are precisely dimensioned such that the end boards do not rub against the saw blades flanking a particular cant.

The cant scanner 1404 may comprise any of a variety of scanners, including a plurality of planar laser scanners, point laser scanners, or others. In one embodiment, the cant scanner 1404 sends data representing cant geometry to the computing device 124 for analysis. In other embodiments, a separate computer optimizer may be used to analyze the scanned cant data.

Based on the cant geometry, the computing device 124 may determine how best to saw each cant. In one embodiment, the computing device 124 may use information regarding the current market value of particular pieces of lumber and may run a brute force simulation of all of the ways of sawing each cant in order to determine the optimal sawing process to extract maximum value. Based on this optimal sawing solution, the computing device 124 may then send commands to the PLC 1402 to position the chip heads 110 and the sawbox 112 appropriately.

The PLC 1402 performs the actual machine control through electromechanical couplings. Such control may be performed by use of stepper motors, rollers, electromagnetic motors, or by other means.

As discussed in detail above, after the boards have been completely sawn by the gangsaw 102, the laser scanners 122 may scan the boards. Image data from the laser scanners 122 may then be transmitted back to the computing device 124 (in this case, the same computing device used for optimization), where it can then be analyzed to determine, inter alia, the performance of each saw blade 202.

In some embodiments, the set of saw blades 202 used to saw a particular cant may be selected based at least in part on the determined performance of each saw blade 202. For example, the set of saw blades 202 selected by the computing device 124 may be selected based on the current capability of each saw blade 202 to cut accurately. The set of saw blades 202 may, for example, be chosen to ensure that sawing accuracy remains within pre-defined limits, and certain saw blades 202 not meeting that sawing accuracy standard may never be used. In other embodiments, a particular saw blade will be allowed to cool down between uses, or a particular saw blade may be used only when cutting straight (for example, if that saw blade no longer produces acceptable boards during curve sawing).

Figure 15:
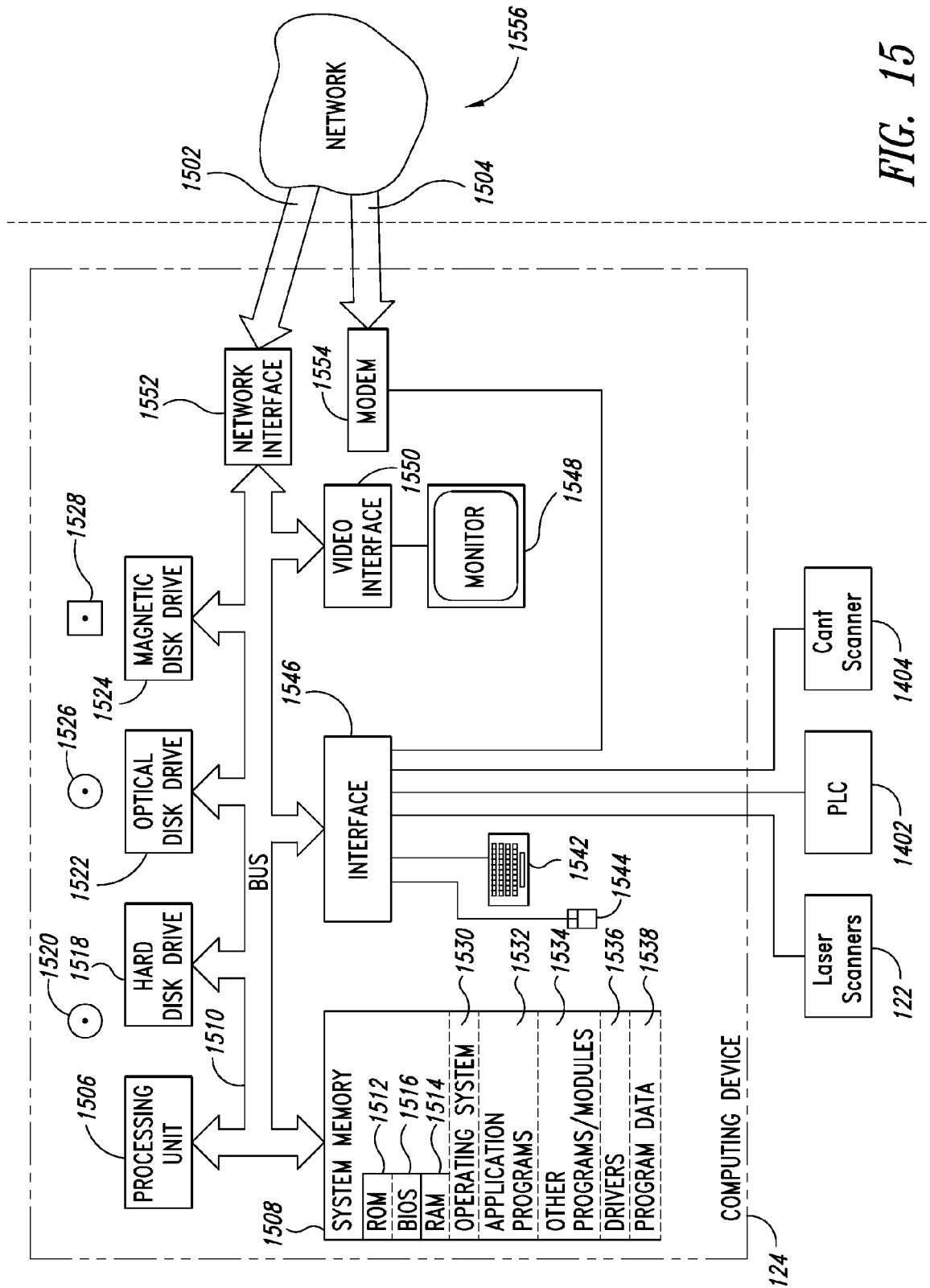
FIG. 15 is a more detailed schematic diagram of the computing device of FIG. 1, according to one illustrated embodiment.

FIG. 15 and the following discussion provide a brief, general description of a suitable computing device 124 for use in the system 100. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 15 shows the computing device 124 coupled by one or more communications channels/logical connections 1502, 1504 to a network 1556. However, in other embodiments, the computing device 124 need not be coupled to a network.

The computing device 124 may take the form of a conventional PC, which includes a processing unit 1506, a system memory 1508 and a system bus 1510 that couples various system components including the system memory 1508 to the processing unit 1506. The computing device 124 will at times be referred to in the singular herein, but this is not intended to limit the embodiments to a single computing system, since in certain embodiments, there will be more than one system or other computing device involved. Non-limiting examples of commercially available computing devices include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 1506 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 15 are of conventional design. As a result, such blocks need not be described in further detail herein, as they will be understood by those skilled in the relevant art.

The system bus 1510 can employ any known bus structures or architectures, including a memory bus with memory controller, a peripheral bus, and a local bus. The system memory 1508 includes read-only memory ("ROM") 1512 and random access memory ("RAM") 1514. A basic input/output system ("BIOS") 1516, which can form part of the ROM 1512, contains basic routines that help transfer information between elements within the computing device 124, such as during start-up.

The computing device 124 also includes a hard disk drive 1518 for reading from and writing to a hard disk 1520, and an optical disk drive 1522 and a magnetic disk drive 1524 for reading from and writing to removable optical disks 1526 and magnetic disks 1528, respectively. The optical disk 1526 can be a CD or a DVD, while the magnetic disk 1528 can be a magnetic floppy disk or diskette. The hard disk drive 1518, optical disk drive 1522 and magnetic disk drive 1524 communicate with the processing unit 1506 via the system bus 1510. The hard disk drive 1518, optical disk drive 1522 and magnetic disk drive 1524 may include interfaces or controllers (not shown) coupled between such drives and the system bus 1510, as is known by those skilled in the relevant art. The drives 1518, 1522, 1524, and their associated computer-readable media 1520, 1526, 1528, provide nonvolatile storage of computer-readable instructions, data structures, program modules and other data for the computing device 124. Although the depicted computing device 124 employs hard disk 1520, optical disk 1526 and magnetic disk 1528, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 1508, such as an operating system 1530, one or more application programs 1532, other programs or modules 1534, drivers 1536 and program data 1538. While shown in FIG. 15 as being stored in the system memory 1508, the operating system 1530, application programs 1532, other programs/modules 1534, drivers 1536 and program data 1538 can be stored on the hard disk 1520 of the hard disk drive 1518, the optical disk 1526 of the optical disk drive 1522 and/or the magnetic disk 1528 of the magnetic disk drive 1524. A user can enter commands and information into the computing device 124 through input devices such as a touch screen or keyboard 1542 and/or a pointing device such as a mouse 1544. Other input devices can include a microphone, joystick, game pad, tablet, scanner, etc. These and other input devices are connected to the processing unit 1506 through an interface 1546 such as a universal serial bus ("USB") interface that couples to the system bus 1510, although other interfaces such as a parallel port, a game port or a wireless interface or a serial port may be used. A monitor 1548 or other display device is coupled to the system bus 1510 via a video interface 1550, such as a video adapter. Although not shown, the computing device 124 can include other output devices, such as speakers, printers, etc.

The computing device 124 may operate in a networked environment using one or both of the logical connections 1502, 1504 to communicate with one or more remote computers, servers and/or devices through the network 1556. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the computing device 124 may include a modem 1554 for establishing communications over the WAN 1504. Alternatively, another device, such as the network interface 1552 (communicatively linked to the system bus 1510), may be used for establishing communications over the WAN 1502. The modem 1554 is shown in FIG. 15 as communicatively linked between the interface 1546 and the WAN 1504. In a networked environment, program modules, application programs, or data, or portions thereof, can be stored in a server computing system (not shown). Those skilled in the relevant art will recognize that the network connections shown in FIG. 15 are only some examples of ways of establishing communications between computers, and other connections may be used, including wirelessly.

As illustrated in FIG. 15, the computing device 124 is further coupled to the laser scanners 122, the PLC 1402 and to the cant scanner 1404. In one embodiment, the laser scanners 122, the PLC 1402 and the cant scanner 1404 are coupled to the system bus 1510 through the interface 1546 and are thereby communicatively coupled to the computing device 124. The computing device 124 may further include optimizer application programs for receiving data from the cant scanner 1404, processing that data, and determining an optimal set of lumber that can be obtained from the cant. In such an embodiment, the computing device 124 may further receive up-to-date market information for lumber via the network 1556. In other embodiments, the computing device 124 may be a separate computing system that may or may not communicate with a computer optimizer.

In one embodiment, the computing device 124 may further include additional drivers and/or application programs to enable the computing device 124 to send commands and/or data to the PLC 1402 in order to control movement of the sawbox 112 and the chip heads 110.

Discussion of a Method of Monitoring Boards According to One Embodiment

Figure 16:
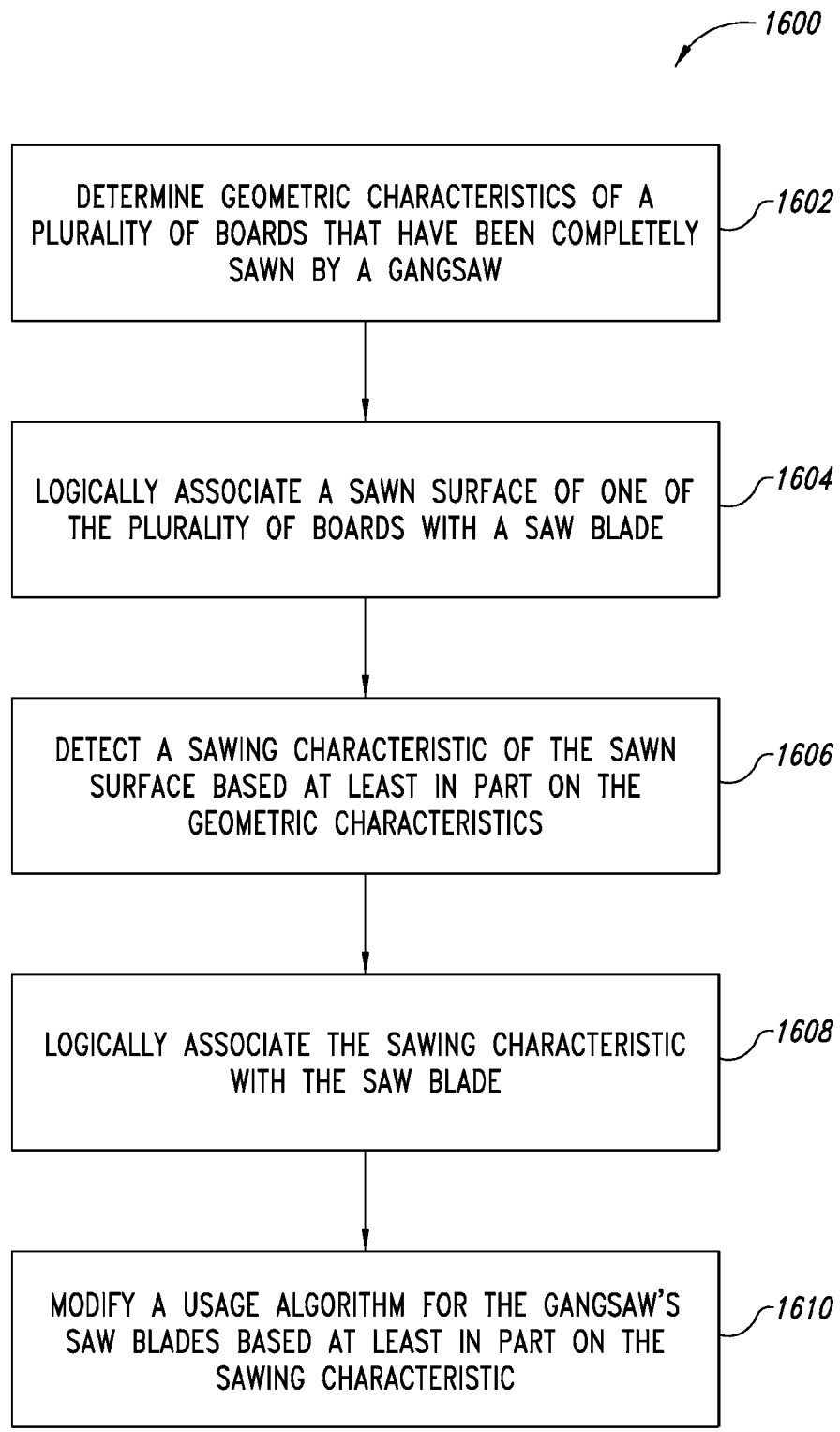
FIG. 16 is a flow diagram illustrating a method of monitoring boards sawn by a gangsaw, according to one illustrated embodiment.

FIG. 16 illustrates a flow diagram for a method of monitoring boards sawn by a gangsaw, according to one embodiment. The flow diagram will be discussed in terms of the system 100 of FIG. 1 and the boards illustrated in FIGS. 10 and 11. However, the acts of the method may be carried out using other systems as well.

The method begins at 1602, when the geometric characteristics of a plurality of boards 114 that have been completely sawn by a gangsaw 102 are determined. This act of determining the geometric characteristics of the boards 114 may be performed using laser scanners 122 communicatively coupled with a computing device 124, as illustrated in FIG. 1. Initially, the laser scanners 122 may scan the boards 114 from a position downstream from the gangsaw 102. Although many of the boards may be partially overlapping, the laser scanners 122 may be positioned to scan at least some of the surfaces of each of the boards 114.

Image data from the scanning may then be forwarded to the computing device 124, where geometric characteristics may be determined for at least some of the boards 114 sawn from each cant 104. These geometric characteristics may include thicknesses and widths of the boards 114, locations of the boards 114, imperfections of the boards 114 associated with sawing characteristics, wane associated with one or more edges of the boards 114, etc.

Referring to FIG. 11, for example, the computing device 124 may determine that there is a discontinuity on the surface 506. The computing device 124 may further determine that this discontinuity is too small to represent an entirely different board and therefore represents a ridge 1102 in the board 508.

In another embodiment, the computing device 124 may determine geometric characteristics of a sawn surface of one board based at least in part on the geometric characteristics of a sawn surface of another board. For example, the computing device 124 may analyze the angles at the corners of the board 512 (right angles may be indicative that a sawn surface has been sawn by a properly aligned saw blade) in order to determine that there is a ridge of the board 512 corresponding to the ridge 1102 that is obscured by the board 508. In another embodiment, the computing device 124 may analyze the thickness of the board 512 at various points along its width in order to determine that a minimum thickness of the board 512 (and therefore a ridge in the board 512) is obscured by the board 508, based on a linear interpolation. Other methods for determining the geometric characteristics of the boards 114 may also be used in other embodiments.

The computing device 124 may also calibrate the measurements taken by the laser scanners 122 by determining a thickness of one of the boards 114 that has approximately the correct nominal value. For example, the computing device 124 may analyze the geometric characteristics of a correctly sawn board, like board 1002 of FIG. 10, calibrate a measured thickness of the board to a known nominal thickness, and use that calibration to analyze other geometric characteristics. For example, the computing device 124 may leverage the calibration to analyze the thicknesses of the end boards, in order to determine whether or not the chip heads 110 are being positioned to correctly size the end boards.

At 1604, a sawn surface of one of the plurality of boards 114 is logically associated with one of the plurality of saw blades 202 of the gangsaw 102. The computing device 124 may use one or more heuristics to determine that a particular sawn surface was sawn by one of the plurality of saw blades 202. For example, the computing device 124 may employ a rule that mismatch may be found a fixed distance from the bottom of a board (e.g., approximately the radius of the saw blades of the bottom arbor), and a variable distance from the top of the board. The computing device 124 may also employ a rule that boards from a cant may separate downstream from the gangsaw but do not swap places. The computing device 124 may further employ a rule that corresponding mismatch and wedging are found on adjacent surfaces of two boards sawn by a defective saw. The computing device 124 may further employ a rule that the thickness of a board's edge closest to a saw guide (e.g., a bottom edge) will match a nominal thickness more closely than a portion of the board further from the saw guide.

Applying the above heuristics to logically associate a sawn surface and a saw blade, the computing device 124 may first obtain information indicative of which saw blades 202 were used to saw a particular cant 104 (i.e., with which saw blade 202 was an end board of the cant 104 aligned). This information may be forwarded to the computing device 124 from the PLC 1402 or from a separate computer optimizer, or may be stored in the computing device 124.

The computing device 124 may also analyze the image data received from the laser scanners 122 in order to determine whether a board 114 has fallen to the left or right after exiting from the gangsaw 102. In other words, the computing device 124 may determine an original orientation of a board 114 within the gangsaw 102 based at least in part on the geometric characteristics of the pile of boards 114. For example, returning to FIG. 11, the computing device 124 may determine that the board 508 must have fallen to the left, since the ridge 1102 is nearest the board's left-most edge. Alternatively, the computing device 124 may analyze the geometric characteristics of the pile of boards 114 to determine whether a particular board 114 has fallen to the left or right. For example, the board 508 could not have fallen on top of the end board, as illustrated, if it had fallen to the right rather than to the left. In yet another embodiment, the relative location of the boards may lead to a determination of whether a particular board 114 has fallen to the left or right.

Based on the saw usage and original orientation of the boards, the computing device 124 may logically associate a sawn surface of one of the boards 114 with one of the saw blades 202. The computing device 124 may perform this logical association by, for example, having a pointer point from data representing the sawn surface to data representing the corresponding saw blade. In another embodiment, data representing the sawn surface and data representing the corresponding saw blade may be stored in a table or database entry. In still another embodiment, each saw blade may have a number of data entries associated therewith, including entries relating to the surfaces sawn by that saw blade.

At 1606, a sawing characteristic is detected based at least in part on the geometric characteristics determined for the plurality of boards. In certain embodiments, the sawing characteristic may represent some degree of mismatch, wedging or complete displacement. In other embodiments, the sawing characteristic may simply be a lack of mismatch, wedging or complete displacement (indicating that the respective saw blade is performing adequately).

For example, referring to FIG. 11, the computing device 124 may detect a sawing characteristic of a corresponding saw blade 504 (namely, mismatch) based on the ridge 1102. The computing device 124 may further determine that the thin portion 1104 of the board 512 is indicative of that same sawing characteristic. In one embodiment, further detail concerning the detected sawing characteristic may also be determined. For example, the computing device 124 may determine the direction and amount of saw misalignment that resulted in the detected mismatch.

At 1608, a sawing characteristic of the sawn surface is logically associated with a particular saw blade 202. In one embodiment, the computing device 124 may perform this act based on the information determined at 1604 and 1606, although in other embodiments, the computing device 124 may skip such intermediate acts and directly associate the detected sawing characteristic with a particular saw blade.

At 1610, a usage algorithm for the saw blades 202 of the gangsaw 102 is modified based at least in part on the detected sawing characteristic. In certain embodiments, such as that illustrated in FIG. 14, the computing device 124 comprises part of the optimization and control system for the gangsaw 102. In other embodiments, the computing device 124 may forward information representative of the detected sawing characteristic to a separate computer optimizer that may in turn modify the usage algorithm for the saw blades 202.

In one embodiment, the computing device 124 may determine a defect limit for a sawing characteristic. For example, the maximum allowable mismatch may be set at 0.05 inches. Modifying the usage algorithm may then include the acts of comparing the sawing characteristic with the defect limit and preventing the use of one of the plurality of saw blades if the sawing characteristic exceeds the defect limit. The defect limit may be determined by the computing device 124 itself in one embodiment, or may be determined by a user and stored at the computing device 124 in another embodiment. The computing device 124 may also generate an alert when the sawing characteristic has exceeded the defect limit, indicating that one of the plurality of saw blades 202 should be replaced. The alert may include a graphical indication on a display of the computing device 124, a sound, or some other mechanism for alerting personnel at the sawmill.

In another embodiment, the computing device 124 may determine whether it is more profitable to keep the gangsaw running with the defective saw blade or to stop the gangsaw in order to change or file the saw blade. Such a determination may take into account: the impact of sawing accuracy on lumber value (e.g., the dimension limits for each lumber grade and the prices by grade), the cost of saw filing, the impact on recovery from reducing the curve sawing limits, the cost in productivity of running more slowly, the cost of downtime to replace the saw blade, real time knowledge of downtime events on other machines that might allow for a saw change without additional productivity loss, and/or scheduled downtime periods.

In other embodiments, the usage algorithm may be modified such that a defective saw blade is not used or to place limitations on the use of the defective saw blade. For example, sawing speed and curve sawing limitations may be placed on use of the defective saw blade.

In yet another embodiment, the computing device 124 may store sawing characteristics and other information associated with particular saw blades in a database. The stored information may include detailed usage data, as in the following example. One saw blade may have been placed in the gangsaw at 2 PM, used 125 times without mismatch, and may have begun to show mismatch at 4 PM. The mismatch for this saw blade may have exceeded a particular defect limit associated with mismatch at 6 PM and may have been replaced at 6:30 PM. Such usage histories for particular saw blades may be used in a variety of ways, including in comparisons against usage histories of saw blades from other manufacturers.

In one embodiment, the sawing characteristics stored in the database may be associated with even more detailed information regarding sawing accuracy (deflection amount and direction), depth of cut, cant length (for computing total sawdust volume per saw), type of saw path (curved vs. straight), and time between cants (for controlling saw temperature). The history of each blade may further be associated with the saw blade's location within the gangsaw, so that problems with saw lubrication may also be diagnosed.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any computer and/or processor related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. A method of operating a gangsaw management system including at least one computing device, the method comprising:
   optically capturing information from each of a plurality of boards that have been completely sawn by a gangsaw having a plurality of blades after at least one of the boards has fallen;
   determining geometric characteristics of the plurality of boards by the at least one computing device of the gangsaw management system based at least in part on the optically captured information; and
   logically associating a sawn surface of one of the plurality of boards with one of the plurality of saw blades by the at least one computing device of the gangsaw management system based at least in part on the determined geometric characteristics of at least one of the plurality of boards.

2. The method of claim 1, wherein optically capturing information from each of a plurality of boards includes scanning the plurality of boards with at least one laser scanner after all of the boards have fallen.

3. The method of claim 1, further comprising:
   determining a previous orientation of the one of the plurality of boards within the gangsaw;
   wherein the sawn surface is logically associated with the one of the plurality of saw blades based at least in part on the previous orientation.

4. The method of claim 1, further comprising:
   detecting a sawing characteristic based at least in part on the determined geometric characteristics;
   logically associating the sawing characteristic with the one of the plurality of saw blades; and
   modifying a usage algorithm for the plurality of saw blades based at least in part on the sawing characteristic.

5. The method of claim 4, wherein the sawing characteristic is at least one of mismatch, wedging or complete displacement.

6. The method of claim 4, wherein modifying the usage algorithm includes generating an alert indicating that the one of the plurality of saw blades should be replaced.

7. The method of claim 4, wherein modifying the usage algorithm includes modifying a speed at which the gangsaw operates.

8. The method of claim 4, further comprising:
   determining a defect limit for the sawing characteristic; and
   wherein modifying the usage algorithm includes:
      comparing the sawing characteristic with the defect limit; and
      preventing use of the one of the plurality of saw blades if the sawing characteristic exceeds the defect limit.

9. The method of claim 1 wherein the gangsaw is a double arbor gangsaw and the optically capturing information includes optically capturing information from only above a plane that extends between the arbors of the gangsaw.

10. A method of operating a gangsaw management system including at least one computing device, the method comprising:
    determining geometric characteristics of a plurality of boards that have been completely sawn by a gangsaw having a plurality of saw blades; and
    detecting a sawing characteristic based at least in part on the determined geometric characteristics;
    logically associating by the at least one computing device the sawing characteristic with the one of the plurality of saw blades; and
    modifying a usage algorithm for the plurality of saw blades by the at least one computing device based at least in part on the sawing characteristic; wherein modifying the usage algorithm includes modifying limitations on curve sawing.

11. A computer-readable storage medium that stores instructions executable by a computing device of a gangsaw management system that cause the computing device to monitor boards that have been sawn by a gangsaw, by:
    determining geometric characteristics of a plurality of boards based at least in part on information optically captured from each of the plurality of boards after the boards have fallen in response to having been completely sawn from a cant by the gangsaw having a plurality of saw blades; and
    logically associating a sawn surface of one of the plurality of boards with one of the plurality of saw blades based at least in part on the determined geometric characteristics.

12. The computer-readable storage medium of claim 11, wherein determining the geometric characteristics of the plurality of boards includes determining the geometric characteristics from scanning information produced by scanning the plurality of boards with at least one laser scanner.

13. The computer-readable storage medium of claim 11, where the instructions cause the computing device to monitor boards, further by:
    determining a previous orientation of the one of the plurality of boards within the gangsaw;
    wherein the sawn surface is logically associated with the one of the plurality of saw blades based at least in part on the previous orientation.

14. The computer-readable storage medium of claim 11, where the instructions cause the computing device to monitor boards, further by:
    detecting a sawing characteristic based at least in part on the determined geometric characteristics;
    logically associating the sawing characteristic with the one of the plurality of saw blades; and
    modifying a usage algorithm for the plurality of saw blades based at least in part on the sawing characteristic.

15. The computer-readable storage medium of claim 14, wherein detecting a sawing characteristic includes detecting at least one of mismatch, wedging, or complete displacement.

16. The computer-readable storage medium of claim 14, wherein modifying the usage algorithm includes generating an alert indicating that the one of the plurality of saw blades should be replaced.

17. The computer-readable storage medium of claim 14, wherein modifying the usage algorithm includes modifying a speed at which the gangsaw operates.

18. The computer-readable storage medium of claim 14, further comprising:
    determining a defect limit for the sawing characteristic; and
    wherein modifying the usage algorithm includes:
       comparing the sawing characteristic with the defect limit; and
       preventing use of the one of the plurality of saw blades if the sawing characteristic exceeds the defect limit.

19. The computer-readable storage medium of claim 11 wherein determining geometric characteristics of a plurality of boards based at least in part on information optically captured from each of the plurality of boards after the boards have fallen includes optically scanning at least one sawn surface of each o the plurality of boards.

20. A computer-readable storage medium that stores instructions that when executed by a computing device of a gangsaw management system monitors a gangsaw having a plurality of saw blades, by:
- determining geometric characteristics of a plurality of boards that have been completely sawn by a gangsaw having a plurality of saw blades; and
- detecting a sawing characteristic based at least in part on the determined geometric characteristics;
- logically associating the sawing characteristic with the one of the plurality of saw blades; and
- modifying a usage algorithm for the plurality of saw blades based at least in part on the sawing characteristic, wherein modifying the usage algorithm includes modifying limitations on curve sawing.

21. A system for monitoring boards that have been sawn by a gangsaw, the system comprising:
- at least one laser scanner positioned to scan at least one sawn surface of each of a plurality of boards that have been completely sawn by a gangsaw having a plurality of saw blades; and
- a computing device coupled to the at least one laser scanner to receive data from the at least one laser scanner, and which determines geometric characteristics of the plurality of boards based on the received data and logically associates the sawn surface of one of the plurality of boards with one of the plurality of saw blades based at least in part on the determined geometric characteristics.

22. The system of claim 21, wherein the computing device is coupled to the gangsaw and controls usage of the plurality of saw blades.

23. The system of claim 22, wherein the computing device detects a sawing characteristic based at least in part on the determined geometric characteristics, to logically associate the sawing characteristic with the one of the plurality of saw blades, and controls usage of the plurality of saw blades based at least in part on the sawing characteristic.

24. The system of claim 23, wherein the sawing characteristic is at least one of mismatch, wedging, or complete displacement.

25. The system of claim 23, wherein the computing device further controls usage of the plurality of saw blades by modifying a speed at which the gangsaw operates.

26. The system of claim 23, wherein the computing device includes a memory on which a defect limit for the sawing characteristic is stored, and wherein the computing device compares the sawing characteristic with the defect limit, and prevents use of the one of the plurality of saw blades if the sawing characteristic exceeds the defect limit.

27. The system of claim 21 wherein the at least one laser scanner is positioned to scan the plurality of boards when the boards are on at least one of a landing table, a rollcase, or a belt conveyor.

28. A system, comprising:
- at least one laser scanner positioned to scan and generate image data of a plurality of boards that have been completely sawn by a gangsaw having a plurality of saw blades; and
- a computing device coupled to the at least one laser scanner to receive the image data from the at least one laser scanner and which, the computing device configured to determine geometric characteristics of the plurality of boards based on the received image data, to detect a sawing characteristic based at least in part on the determined geometric characteristics, to logically associate the sawing characteristic with the one of the plurality of saw blades, and to control usage of the plurality of saw blades based at least in part on the sawing characteristic, and to control usage of the plurality of saw blades by modifying limitations on curve sawing based on the detected sawing characteristics.

* * * * *